(12) United States Patent
Slanover

(10) Patent No.: US 11,125,386 B2
(45) Date of Patent: Sep. 21, 2021

(54) SENSOR FOR STEAM TRAP AND METHOD OF OPERATION

(71) Applicant: Consolidated Edison Company of New York, Inc., New York, NY (US)

(72) Inventor: Thomas Edison Slanover, Hicksville, NY (US)

(73) Assignee: CONSOLIDATED EDISON COMPANY OF NEW YORK, INC., New York, NY (US)

( * ) Notice: Subject to any disclaimer, the term of this patent is extended or adjusted under 35 U.S.C. 154(b) by 73 days.

(21) Appl. No.: 16/511,442

(22) Filed: Jul. 15, 2019

(65) Prior Publication Data

US 2021/0018142 A1 Jan. 21, 2021

(51) Int. Cl.
*F16T 1/48* (2006.01)
*F16K 37/00* (2006.01)
*G01D 5/14* (2006.01)

(52) U.S. Cl.
CPC ............ *F16T 1/48* (2013.01); *F16K 37/0041* (2013.01); *G01D 5/142* (2013.01); *Y10T 137/8242* (2015.04)

(58) Field of Classification Search
CPC ....... F16T 1/48; F16K 37/0041; G01D 5/142; Y10T 137/8242
See application file for complete search history.

(56) References Cited

U.S. PATENT DOCUMENTS

| | | | | |
|---|---|---|---|---|
| 2,966,618 A | * | 12/1960 | Lchner | B29C 33/0016 361/808 |
| 4,061,988 A | * | 12/1977 | Lewandowski | H01L 43/00 338/32 H |
| 4,088,946 A | * | 5/1978 | Charles | G01N 27/82 324/220 |
| 4,156,820 A | * | 5/1979 | Fukuda | H01L 43/06 307/116 |
| 4,340,877 A | * | 7/1982 | Herden | G01L 9/14 338/32 H |
| 5,086,273 A | * | 2/1992 | Leon | F16K 37/0041 324/207.17 |
| 5,140,263 A | * | 8/1992 | Leon | G01B 7/14 324/207.17 |
| 5,236,011 A | * | 8/1993 | Casada | F16K 37/0041 137/554 |
| 5,471,138 A | * | 11/1995 | Glass, III | G01D 5/2013 137/554 |
| 5,504,426 A | * | 4/1996 | Ricci | G01B 7/003 137/554 |
| 6,145,529 A | | 11/2000 | Hellman et al. | |

(Continued)

FOREIGN PATENT DOCUMENTS

EP 0402463 B1 4/1993

*Primary Examiner* — Marina A Tietjen
*Assistant Examiner* — Frederick D Soski
(74) *Attorney, Agent, or Firm* — Cantor Colburn LLP

(57) ABSTRACT

According to one aspect of the disclosure a steam trap system and a method of operation is provided. The steam trap system includes a steam trap body and a disk operably coupled to the steam trap body, the disk being made from a magnetic material. A cap is coupled to the steam trap body adjacent the disk, the cap being made from a nonmagnetic material. A hall effect sensor operably coupled to the cap, the hall effect sensor being configured to generate a signal in response to movement of the disk.

15 Claims, 4 Drawing Sheets

(56) References Cited

U.S. PATENT DOCUMENTS

| | | | |
|---|---|---|---|
| 6,675,665 B2 | 1/2004 | Blazquez Navarro et al. | |
| 7,025,089 B1* | 4/2006 | Marsac | F16K 37/0033 137/554 |
| 7,231,840 B1* | 6/2007 | O'Kane | G01N 1/12 73/864.63 |
| 10,488,872 B2* | 11/2019 | Koinke | F16K 31/1262 |
| 2002/0153045 A1* | 10/2002 | Beyrak | F16K 37/0041 137/554 |
| 2003/0131896 A1* | 7/2003 | Yajima | F15B 13/0402 137/625.65 |
| 2003/0233203 A1* | 12/2003 | Grumstrup | G01F 1/42 702/98 |
| 2007/0241298 A1* | 10/2007 | Herbert | F16K 7/16 251/129.04 |
| 2008/0290974 A1* | 11/2008 | Adams | F16K 37/0041 335/301 |
| 2010/0043897 A1* | 2/2010 | Grace | E21B 33/076 137/624.27 |
| 2011/0231024 A1* | 9/2011 | Medizade | F04B 49/065 700/282 |
| 2011/0234418 A1* | 9/2011 | Liao | F16T 1/48 340/679 |
| 2011/0247484 A1* | 10/2011 | Kiesbauer | G01B 7/023 91/361 |
| 2012/0234409 A1* | 9/2012 | Klicpera | B05B 12/02 137/551 |
| 2012/0317980 A1* | 12/2012 | Gilmore | B60H 1/3232 60/641.2 |
| 2013/0032743 A1* | 2/2013 | Fong | F02D 13/02 251/231 |
| 2013/0340619 A1* | 12/2013 | Tammera | B01D 53/047 96/121 |
| 2014/0202542 A1* | 7/2014 | LaRocque | C02F 1/04 137/1 |
| 2014/0239217 A1* | 8/2014 | Ho | F16K 27/041 251/357 |
| 2016/0371316 A1* | 12/2016 | Okanohara | G06N 3/0454 |
| 2017/0206464 A1* | 7/2017 | Clayton | G06N 3/0445 |
| 2017/0292658 A1* | 10/2017 | Caputo | F17D 3/145 |
| 2018/0106393 A1* | 4/2018 | Laessler | G05D 16/0647 |
| 2018/0245709 A1* | 8/2018 | Zlatintsis | F16K 37/0066 |
| 2019/0032848 A1* | 1/2019 | Miller | F01K 25/08 |
| 2019/0137000 A1* | 5/2019 | Grosse | F16K 31/02 |
| 2019/0285193 A1* | 9/2019 | Gruson | F16K 31/0641 |
| 2020/0018419 A1* | 1/2020 | Shirai | F16K 37/0041 |

* cited by examiner

SENSOR FOR STEAM TRAP AND METHOD OF OPERATION

BACKGROUND

The subject matter disclosed herein relates to a pressure trap, such as those used in steam distribution systems, and in particular to a pressure trap having a sensor that can determine if the trap is in an open position or a closed position.

Steam traps are a common item of equipment in steam distribution systems (e.g. district heating systems), factories, refineries and other industrial or commercial facilities. The steam traps are installed in process steam lines and act to separate condensed steam, or "condensate", from the steam without allowing the steam to escape. The separated condensate may then recycled back through condensate return lines to the boiler for conversion back to steam. To be effectively operating, the steam trap prevents steam from escaping past the steam trap and entering the condensate return lines. If steam is allowed to pass through the steam trap into the condensate return line, the result is a loss of valuable energy and a reduction in the efficiency of the steam system.

There are several well-known types of steam traps, including inverted bucket traps, float traps, thermostatic traps and disc traps. Manufacturing facilities, refineries and large buildings often are fitted with extensive systems of steam lines for heating and for process steam. Some of these facilities can contain upwards of 1,000 or more steam traps. To promote efficient operation of the steam traps, some type of monitoring or inspection is required to detect malfunctioning traps so that they can be corrected.

The monitoring of existing disk-type steam traps involves the monitoring of the temperature of the steam trap. From this temperature, the position of the disk is inferred. It should be appreciated that the Accordingly, while existing steam trap monitoring systems are suitable for their intended purposes the need for improvement remains, particularly in providing steam trap having a sensor having the features described herein.

BRIEF DESCRIPTION

According to one aspect of the disclosure a steam trap system is provided. The steam trap system includes a steam trap body and a disk operably coupled to the steam trap body, the disk being made from a magnetic material. A cap is coupled to the steam trap body adjacent the disk, the cap being made from a nonmagnetic material. A hall effect sensor operably coupled to the cap, the hall effect sensor being configured to generate a signal in response to movement of the disk.

In addition to one or more of the features described above, or as an alternative, further embodiments of the system may include the nonmagnetic material being an austenitic nickel-chromium alloy. In addition to one or more of the features described above, or as an alternative, further embodiments of the system may include the austenitic nickel-chromium alloy being Inconel 600. In addition to one or more of the features described above, or as an alternative, further embodiments of the system may include the disk being movable between an open and a closed position, and the sensor being configured to output a first voltage when the disk is in the closed position and a second voltage when the disk is in the open position. In addition to one or more of the features described above, or as an alternative, further embodiments of the system may include the sensor having an end that is offset from the cap.

In addition to one or more of the features described above, or as an alternative, further embodiments of the system may include a module operably coupled to the sensor to receive the signal via a first communications medium and transmit a second signal via a second communications medium.

According to another aspect of the disclosure a method of operating a disk-type steam trap is provided. The method includes flowing a fluid that includes steam and condensate into a steam trap. A disk is moved within the steam trap from a closed position to an open position when condensate is present in the steam trap. A change in a magnetic field with a hall-effect sensor is made in response to the movement of the disk from the closed position to the open position. A second signal is transmitted with the sensor in response to the movement of the disk from the closed position to the open position.

In addition to one or more of the features described above, or as an alternative, further embodiments of the method may include moving the disk to the closed position when condensate is not present in the steam trap, and wherein the sensor outputs a first voltage when the disk is in the closed position. In addition to one or more of the features described above, or as an alternative, further embodiments of the method may include transmitting the second signal over a first communications medium to a module; and transmitting with the module a third signal to a remote computer in response to receiving the second signal at the module.

According to yet another aspect of the disclosure a steam trap system is provided. The steam trap system includes a steam trap body having an inlet and an outlet. A disk is operably coupled to the steam trap body, the disk being made from a magnetic material. A cap is coupled to the steam trap body adjacent the disk, the cap being made from a nonmagnetic material. A frame member is coupled to the cap. A hall effect sensor is coupled to the frame member, the hall effect sensor being configured to generate a signal in response to movement of the disk.

In addition to one or more of the features described above, or as an alternative, further embodiments of the system may include a first planar member disposed about the cap, and a second planar member disposed about and coupled to the frame member. In addition to one or more of the features described above, or as an alternative, further embodiments of the method may include the frame member includes a body portion and a pair of arms, the arms extending past sides of the cap. In addition to one or more of the features described above, or as an alternative, further embodiments of the method may include a fastener coupled to at least one of the arms, the fastener coupling the at least one of the arms to the cap.

In addition to one or more of the features described above, or as an alternative, further embodiments of the method may include the sensor being configured to output a first signal when the disk is in a closed position and a second signal when the disk is in an open position. In addition to one or more of the features described above, or as an alternative, further embodiments of the method may include a module coupled to communicate with the sensor, the module being configured to transmit a third signal in response to receiving the first signal or the second signal.

In addition to one or more of the features described above, or as an alternative, further embodiments of the method may include the frame being sized to position an end of the sensor offset from the cap. In addition to one or more of the features described above, or as an alternative, further embodiments of the method may include the nonmagnetic material being an austenitic nickel-chromium alloy. In addition to one or more of the features described above, or as an alternative, further embodiments of the method may include the austenitic nickel-chromium alloy being Inconel 600.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the present disclosure provide advantages in the monitoring of the position of a disk within a disk-type steam trap to determine whether condensate is flowing out of the steam trap.

Figure 1:
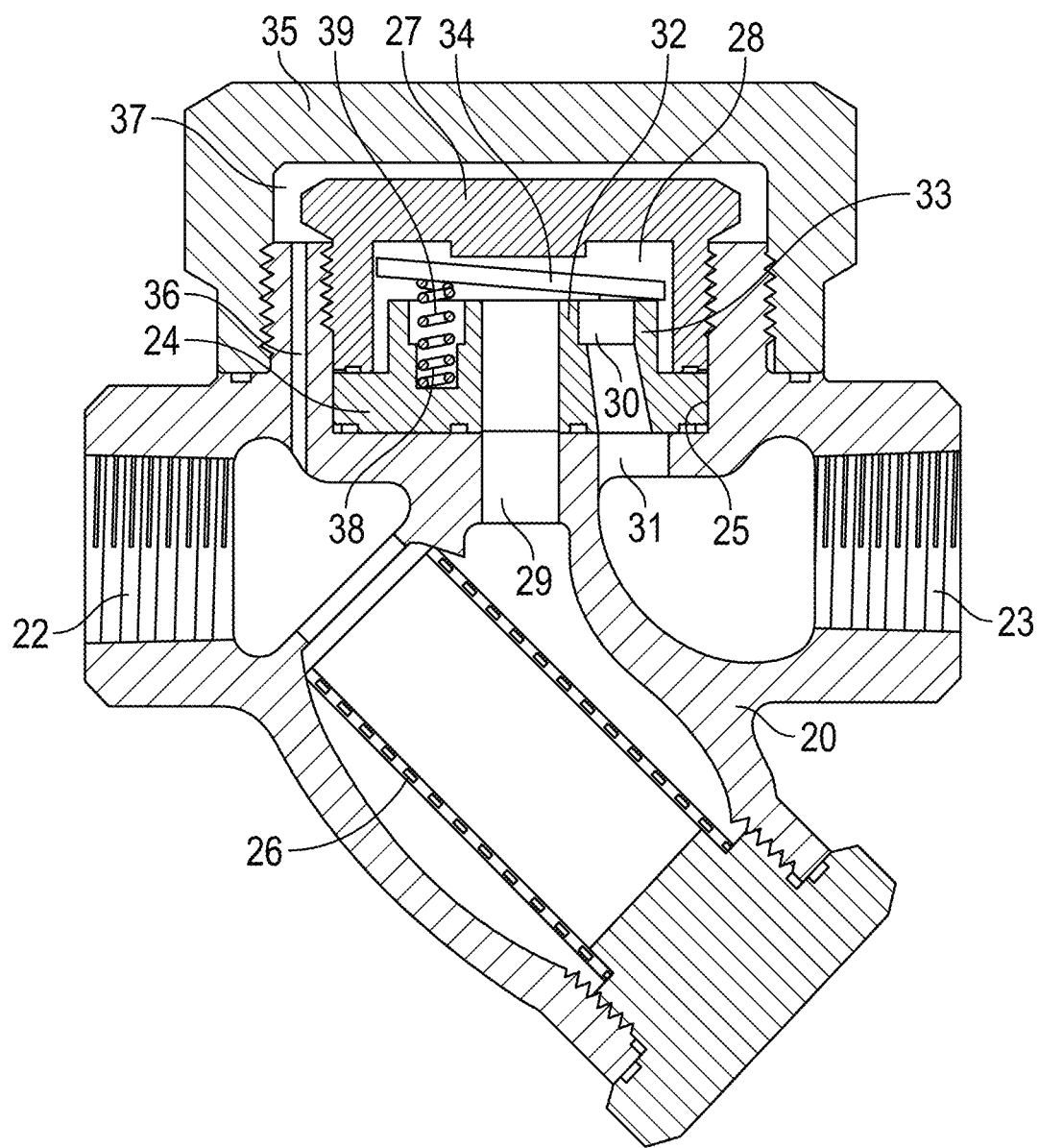
FIG. 1 is a side sectional view of a prior art steam trap.

Referring now to FIG. 1, an embodiment of a prior art a disk-type steam trap is shown as comprising a main body 20 having an inlet port 22 and an outlet port 23 which are substantially coaxial with each other, and a recess 25 in which a valve seat member 24 is fitted. The inlet port 22 is in fluid communication with the center of the recess 25 and a screen 26 is disposed between the inlet port 22 and the recess 25. The outlet port 23 is in fluid communication with a peripheral portion of the recess 25. It should be appreciated that while a particular disk-type steam trap is shown herein, this is for example purposes and the claims should not be so limited. The sensor arrangement described herein may be used with any disk-type steam trap.

Two annular gaskets are disposed between the valve seat member 24 and the bottom of the recess 25. An inner cover 27 is threadedly connected into a cylindrical projection defining the recess 25 and thereby secures the valve seat member 24 to the main body 20. An annular gasket is disposed between the valve seat member 24 and the inner cover 27. The valve seat member 24 and the inner cover 27 define a variable pressure chamber 28 therebetween.

The valve seat member 24 has an inlet port 29 extending through its center and communicating with the inlet port 22 of the main body 20. The valve seat member 24 also has an annular groove 30 encircling the inlet port 29 and an outlet port 31 connected with the annular groove 30 and communicating with the outlet port 23 of the main body 20. The inlet port 29 and the annular groove 30 define an inner seat ring 32 therebetween and an outer seat ring 33 encircles the annular groove 30. A valve disk 34 is provided in the variable pressure chamber 28. It is not secured anywhere but is movable so as to come to rest on a valve seat defined by the inner and outer seat rings 32 and 33 or so as to move away therefrom. An outer cover 35 surrounds the inner cover 27 and is threadedly connected about the cylindrical projection defining the recess 25. An annular gasket is disposed between the main body 20 and the outer cover 35. The inner and outer covers 27 and 35 define a heat insulating chamber 37 therebetween. The cylindrical projection of the main body 20 has a passage 36 connecting the main body 20 adjacent to the inlet port 22 and the heat insulating chamber 37.

The valve seat member 24 has a hole 38 formed by deepening the annular groove 30 in a portion on the opposite side of the inlet port 29 from the outlet port 31. A double-coiled bimetallic member 39 is disposed in the hole 38. The bimetallic member 39 may comprise a strip coiled.

During the beginning of operation of the steam trap, when the steam trap is still at a low temperature, the bimetal 39 is in its expanded state and has an upper end projecting above the valve seat on the top of the valve seat member 24, keeping the disk 34 in its open position away from the valve seat, as shown in FIG. 1. When a large quantity of cold condensed water and air flow into the trap through the inlet ports 22 and 29 and out through the annular groove 30 and the outlet ports 31 and 23 rapidly. When hot condensed water flows into the steam trap, the bimetal 39 is heated and contracts into the annular groove 30, allowing the disk 34 to rest on the valve seat. The steam trap thereafter functions to discharge condensed water, while retaining steam, in accordance with the principle of operation which is well known in the art. If air flows into the variable pressure chamber 28, it forces the disk 34 into its closed position, but if the temperature of the fluid in the chamber 28 drops below a certain level, the bimetal 39 expands and forces the disk 34 open.

Figure 2:
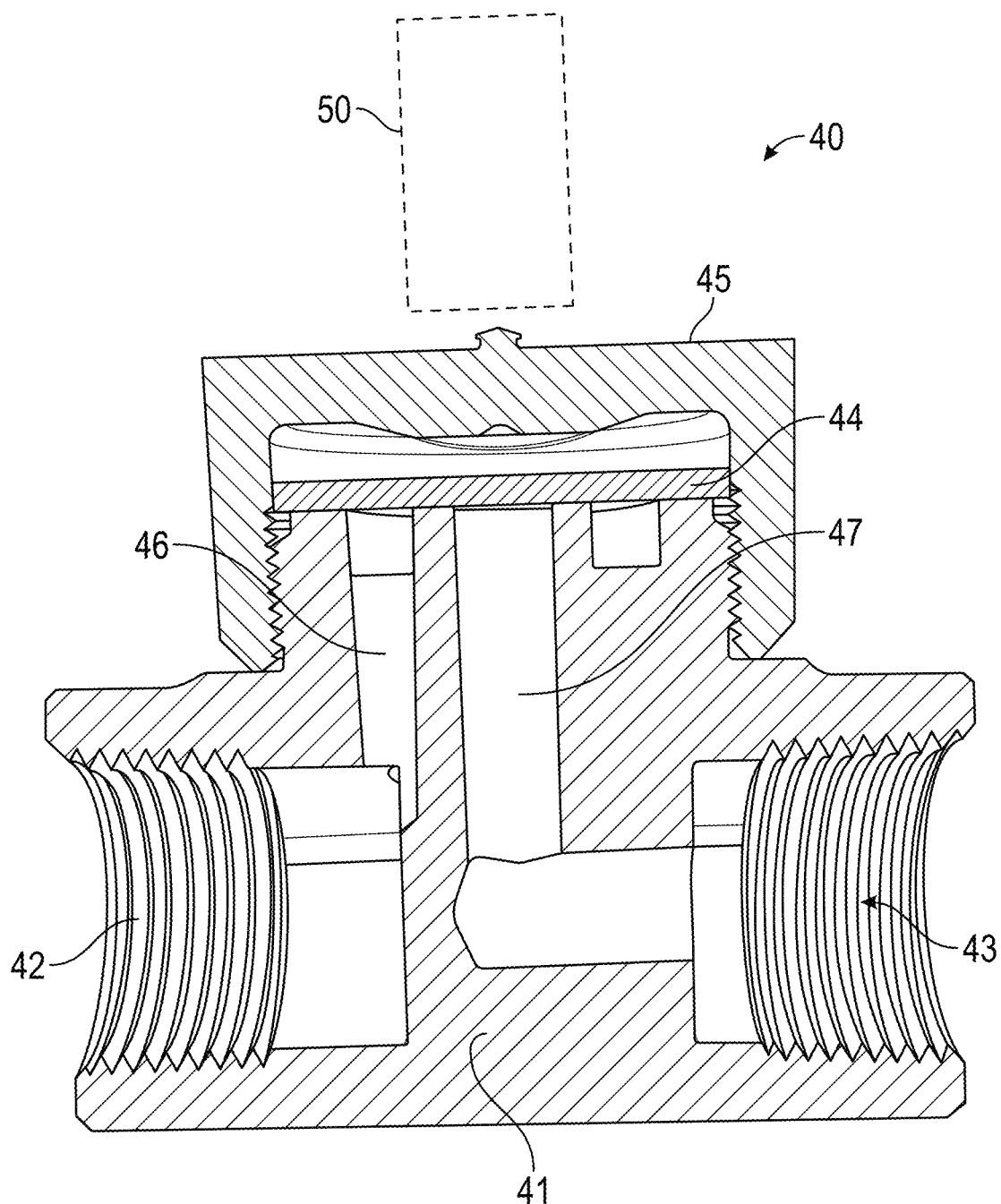
FIG. 2 is a side sectional view of a steam trap in accordance with an embodiment.

Referring to FIG. 2, another steam trap 40 is shown. The steam trap 40, sometimes referred to as a thermodynamic steam trap cycles periodically to discharge condensate the is very near to steam temperature. In an embodiment, the steam trap 40 is Model TD52 steam trap manufactured by Spirax Sarco, Inc. of Blythewood, S.C., USA. The steam trap 40 includes a trap body 41, having an inlet 42 and an outlet 43. A disk 44 is disposed between a cap 45 and the body 41. The disk 44 is fluidly coupled to ports 46, 47 that allow for operation of the steam trap and flow of condensate from the steam system. In the exemplary embodiment, the cap 45 is made from a nonmagnetic material. In an embodiment, the cap 45 is made from a high temperature nonmagnetic metal, such as but not limited to an austenitic nickel-chromium alloy or Inconel 600 for example. It should be appreciated that in some embodiments, the trap body 41 may include a second outlet, such as with a strainer, to allow the flow of steam as is known in the art.

Mounted to the cap 45 is a sensor 50. The sensor 50 is a sensor that is configured to measure changes in magnetic field. In an embodiment, the sensor 50 is a hall-effect type sensor that outputs a voltage (e.g. 2 volts less than the supply voltage) in response to the position of the disk 44. In an embodiment, the supply voltage is 12 volts, the sensor 50 outputs 10 volts when the disk is in the open state. It is desirable for the operator of the steam system to know whether the disk 34 is in the open or closed state. Monitoring of the state of the disk 34 could allow the operator to detect issues or changes in operation of the steam system. In an embodiment, the sensor 50 is configured to act as a switch, such that a first voltage (e.g. zero volts) is output when the disk 44 is in the down position and a second voltage (e.g. two volts less than the supply voltage) is output when the disk 44 is in the up position. It should be appreciated that the sensor 50 is able to measure the change in magnetic field due to the movement of the disk 44 since the cap 45 is made from a nonmagnetic material.

Figure 3:
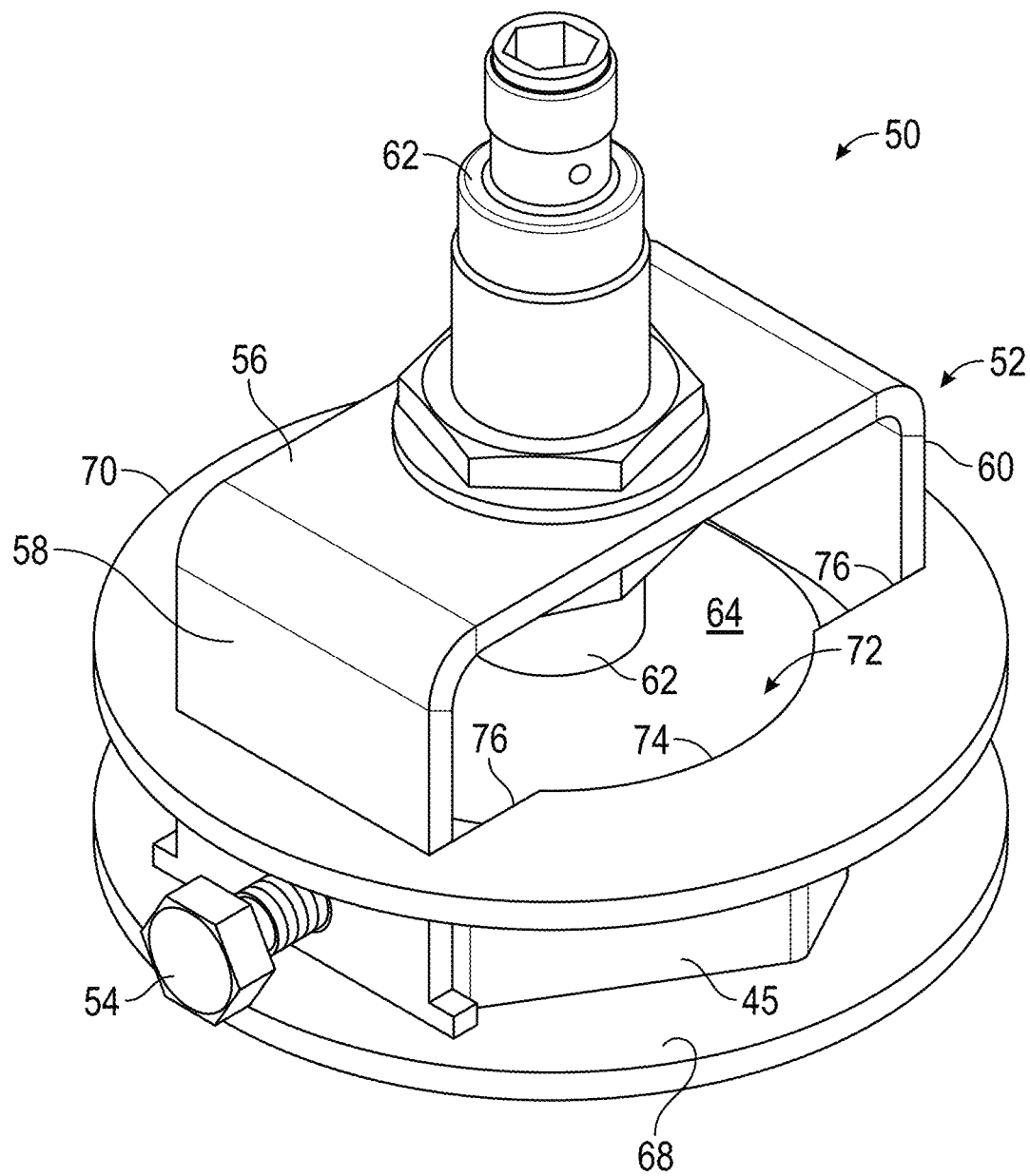
FIG. 3 is a perspective view of a sensor assembly for use with the steam trap of FIG. 2 in accordance with an embodiment.

Referring now to FIG. 3, an embodiment of the sensor assembly 50 is shown. In this embodiment, the sensor assembly 50 includes a frame member 52 that is coupled to the cap 45 by a fastener 54. In the illustrated embodiment, the frame member 52 is generally u-shaped having a body 56 and a pair of arms 58, 60 extending therefrom. The body 56 being sized such that the arms 58, 60 closely fit the sides of the cap 45. In an embodiment, the cap 45 has a hexagonal shape to allow a tool (e.g. a wrench) to loosen and tighten the cap 45 for servicing of the steam trap 40. The fastener 54 threads into the arm 58 to clamp the frame member 52 onto the cap 54.

The body 56 includes an opening sized to receive a sensor member 62. In the illustrated embodiment, the sensor member 62 is a hall-effect type sensor that measures changes in magnetic fields. The sensor member 62 outputs a voltage (e.g. 0 to 10 volts when the supply voltage is 12 volts) in response to the position of the disk 44. In an embodiment, the sensor member 62 is configured to act as a switch, such that a first voltage (e.g. zero volts) is output when the disk 44 is in the down position and a second voltage (e.g. ten volts) is output when the disk 44 is in the up position. In an embodiment, the sensor member 62 includes an end 64 adjacent the top surface 66 of the cap 45. In an embodiment, the end 64 is spaced apart from the surface 66. In another embodiment, the end 64 is in contact with the surface 66.

In the illustrated embodiment, the sensor assembly 50 further includes an optional first planar member 68 disposed between the end of the arms 58, 60 and the body 41. In this embodiment, the first planar member includes a hexagonal shaped opening sized to receive the cap 45. In an embodiment, the sensor assembly 50 further includes an optional second planar member 70 that includes an opening 72 with a semi-circular portion 74 and a pair of opposing rectangular portions 76. The rectangular portions 76 being sized and positioned to receive the arms 58, 60. In the illustrated embodiment, the planar members 68, 70 are made from a stainless steel. In an embodiment, the planar members 68, 70 are made from a nonmagnetic material.

Figure 4:
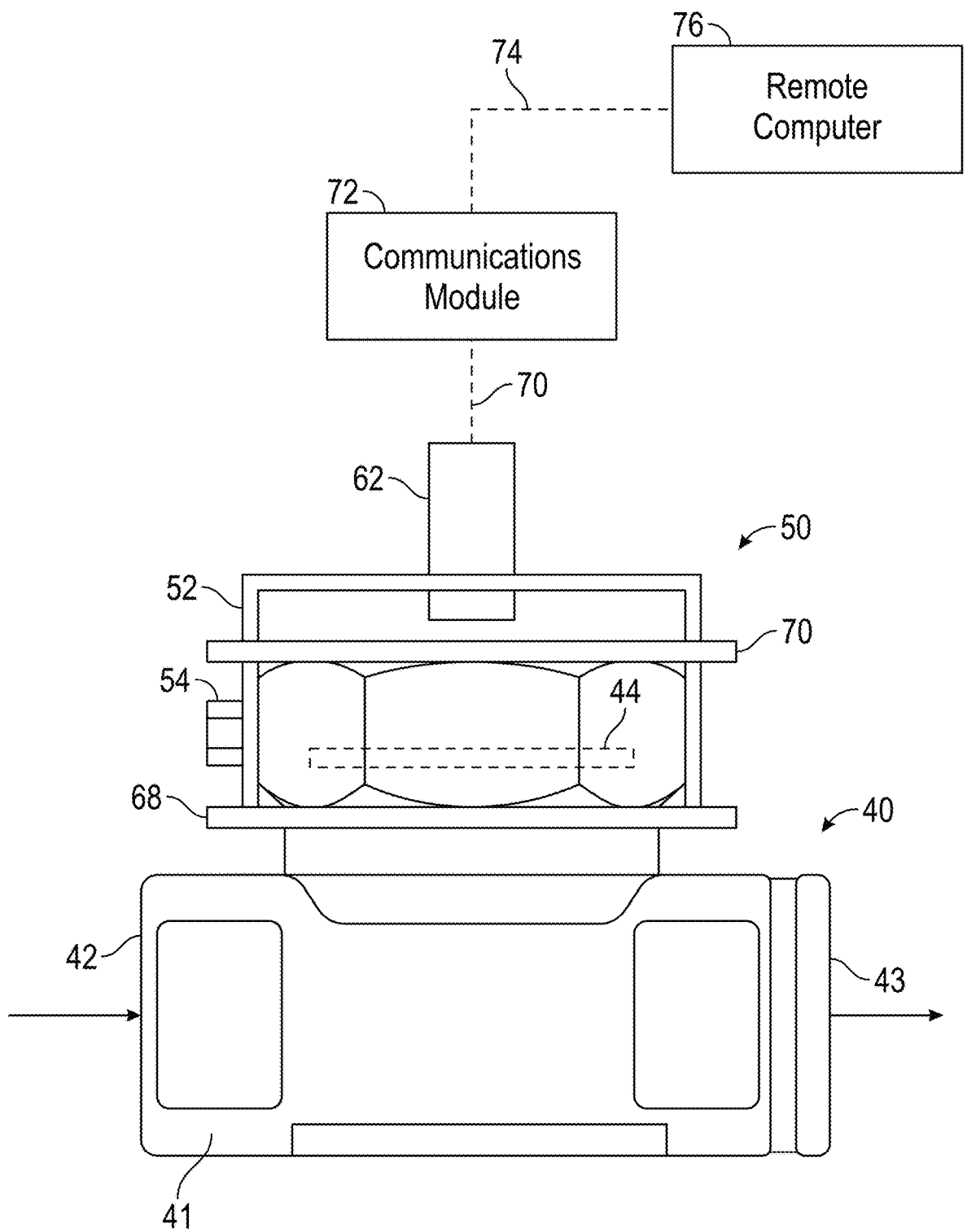
FIG. 4 is a schematic view of a steam trap system in accordance with an embodiment.

Referring now to FIG. 4, operation of the sensor assembly 50 and the steam trap 40 will be described. Steam and condensate enter the steam trap 40 via the inlet 42. The steam trap 40 separates the condensate and removes it from the steam flow based on the position of the disk 44 as is known in the art. The steam then exits the steam trap 40 via outlet 43. As the position of the disk 44 changes, the sensor member 62 transmits a signal (e.g. a voltage) via a first communications medium 70 to a module 72. The first communications medium 70 may be wired or wireless. In an embodiment, the module 72 will include a communications circuitry or module that is configured to transmit a second signal that indicates whether the disk is in the up (open) or down (closed position) via second communications medium 74. In an embodiment, the module 72 may be located a distance from the sensor assembly 50 to avoid operating the module 72 in a high temperature environment of the steam trap 40. In an embodiment, the hall-effect sensor circuitry is positioned within the module 72. The second signal may be a digital or analog signal. The second communications medium may be wired or wireless.

The second wireless communications medium 74 connects the module 72 with a remote computer 76 or controller. It should further be appreciated that the second wireless communications medium 74 may not be a direct connection, but rather allows for the transmission of the second signal through a network (e.g. cellular, peer-to-peer, WiFi, ethernet, etc.). The computer 76 may be located at a control center that allows the steam system operator to monitor the operations of the steam system.

The term "about" is intended to include the degree of error associated with measurement of the particular quantity based upon the equipment available at the time of filing the application.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A steam trap system comprising:
   a steam trap body;
   a disk operably coupled to the steam trap body, the disk being made from a magnetic material;
   a cap coupled to the steam trap body adjacent the disk, the cap being made from a nonmagnetic material, wherein the disk is disposed within the cap; and
   a hall effect sensor operably coupled to the cap on an opposite side of the cap from the disk, the hall effect sensor that generates a signal in response to movement of the disk.

2. The system of claim 1, wherein the nonmagnetic material is an austenitic nickel-chromium alloy.

3. The system of claim 2, wherein the austenitic nickel-chromium alloy is Inconel 600.

4. The system of claim 1, wherein:
   the disk is movable between an open and a closed position; and the sensor outputs a first voltage when the disk is in the closed position and a second voltage when the disk is in the open position.

5. The system of claim 4, wherein the sensor includes an end that is offset from the cap.

6. The system of claim 1, further comprising a module operably coupled to the sensor and receives the signal via a first communications medium and transmits a second signal via a second communications medium.

7. A steam trap system comprising:
a steam trap body having an inlet and an outlet;
a disk operably coupled to the steam trap body, the disk being made from a magnetic material;
a cap coupled to the steam trap body between the inlet and the outlet, the cap being made from a nonmagnetic material, wherein the disk is disposed within the cap;
a u-shaped frame member coupled to the cap opposite the disk, wherein the frame member is shaped to allow a tool to loosen or tighten the cap; and
a hall effect sensor coupled to the frame member, the hall effect sensor being generating a signal in response to movement of the disk.

8. The system of claim 7, further comprising:
a first planar member disposed about the cap; and
a second planar member disposed about and coupled to the frame member.

9. The system of claim 7, wherein the sensor outputs a first signal when the disk is in a closed position and a second signal when the disk is in an open position.

10. The system of claim 9, further comprising a module coupled to communicate with the sensor, the module transmitting a third signal in response to receiving the first signal or the second signal.

11. The system of claim 7, wherein the frame is sized to position an end of the sensor offset from the cap.

12. The system of claim 7, wherein the nonmagnetic material is an austenitic nickel-chromium alloy.

13. The system of claim 12, wherein the austenitic nickel-chromium alloy is Inconel 600.

14. A steam trap system comprising:
a steam trap body having an inlet and an outlet;
a disk operably coupled to the steam trap body, the disk being made from a magnetic material;
a cap coupled to the steam trap body adjacent the disk, the cap being made from a nonmagnetic material;
a frame member coupled to the cap;
a hall effect sensor coupled to the frame member, the hall effect sensor being configured to generate a signal in response to movement of the disk
a first planar member disposed about the cap; and
a second planar member disposed about and coupled to the frame member; and
wherein the frame member includes a body portion and a pair of arms, the arms extending past sides of the cap.

15. The system of claim 14, further comprising a fastener coupled to at least one of the arms, the fastener coupling the at least one of the arms to the cap.

\* \* \* \* \*